United States Patent
Hersam et al.

(10) Patent No.: US 12,473,451 B2
(45) Date of Patent: *Nov. 18, 2025

(54) PRINTABLE IONOGEL INKS AND FORMING METHODS AND APPLICATIONS OF SAME

(71) Applicant: NORTHWESTERN UNIVERSITY, Evanston, IL (US)

(72) Inventors: Mark C. Hersam, Wilmette, IL (US); Woo Jin Hyun, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 678 days.

This patent is subject to a terminal disclaimer.

(21) Appl. No.: 17/798,618

(22) PCT Filed: Jan. 28, 2021

(86) PCT No.: PCT/US2021/015375
§ 371 (c)(1),
(2) Date: Aug. 10, 2022

(87) PCT Pub. No.: WO2021/162862
PCT Pub. Date: Aug. 19, 2021

(65) Prior Publication Data
US 2023/0087700 A1 Mar. 23, 2023

Related U.S. Application Data

(60) Provisional application No. 62/975,282, filed on Feb. 12, 2020.

(51) Int. Cl.
| | | |
|---|---|---|
| C09D 11/52 | (2014.01) |
| B82Y 30/00 | (2011.01) |
| B82Y 40/00 | (2011.01) |
| C09D 11/033 | (2014.01) |
| H01G 9/028 | (2006.01) |
| H01G 11/56 | (2013.01) |
| H01M 6/16 | (2006.01) |

(52) U.S. Cl.
CPC ............ *C09D 11/52* (2013.01); *C09D 11/033* (2013.01); *H01G 9/028* (2013.01); *H01G 11/56* (2013.01); *H01M 6/162* (2013.01); *H01M 6/164* (2013.01); *H01M 6/168* (2013.01); *B82Y 30/00* (2013.01); *B82Y 40/00* (2013.01); *H01M 2300/0025* (2013.01); *H01M 2300/0028* (2013.01); *H01M 2300/0085* (2013.01)

(58) Field of Classification Search
CPC ....... C09D 11/52; H01G 9/028; H10M 6/162; H10M 6/168; H10M 6/164; H10M 2300/0025; H10M 2300/0028; H10M 2300/0085
See application file for complete search history.

(56) References Cited

U.S. PATENT DOCUMENTS

| | | | |
|---|---|---|---|
| 7,955,738 B2 | 6/2011 | Singh et al. | |
| 2007/0275546 A1* | 11/2007 | Maruyama | H01G 9/2009 438/497 |
| 2008/0191200 A1 | 8/2008 | Frisbie et al. | |
| 2018/0102223 A1 | 4/2018 | Wei et al. | |
| 2018/0226680 A1 | 8/2018 | Wright et al. | |
| 2019/0131554 A1 | 5/2019 | Liu et al. | |

FOREIGN PATENT DOCUMENTS

| | | |
|---|---|---|
| CN | 108878970 A | 11/2018 |
| EP | 3226339 A1 | 10/2017 |
| JP | 2015-187057 | * 10/2015 |
| WO | 2008097300 A2 | 8/2008 |
| WO | 2016025743 A1 | 2/2016 |
| WO | WO-2020069576 A1 * | 4/2020 |

OTHER PUBLICATIONS

Korean Intellectual Property Office (ISR/KR), "International Search Report for PCT/US2021/015375", Korea, May 11, 2021.
Hyun, W. J., et al., "Printable hexagonal boron nitride ionogels.", Faraday Discussions, 2020, pp. 1-23, published on Jan. 15, 2020.
A. C. Arias, S. E. Ready, R. Lujan, W. S. Wong, K. E. Paul, A. Salleo, M. L. Chabinyc, R. Apte and R. A. Street, All jet-printed polymer thin-film transistor active-matrix backplanes, Appl. Phys. Lett., 2004, 85, 3304-3306.
M. Berggren, D. Nilsson and N. D. Robinson, Organic materials for printed electronics, Nat. Mater., 2007, 6, 3-5.
V. Subramanian, J. M. J. Fréchet, P. C. Chang, D. C. Huang, J. B. Lee, S. E. Molesa, A. R. Murphy, D. R. Redinger and S. K. Volkman, Progress Toward Development of All-Printed RFID Tags: Materials, Processes, and Devices, Proc. IEEE, 2005, 93, 1330-1338.

(Continued)

*Primary Examiner* — C Melissa Koslow
(74) *Attorney, Agent, or Firm* — troutman pepper locke; Tim Tingkang Xia, Esq.

(57) ABSTRACT

One aspect of this invention relates to hexagonal boron nitride (hBN) ionogel inks using exfoliated hBN nanoplatelets as the solid matrix. The hBN nanoplatelets are produced from bulk hBN powders by liquid-phase exfoliation, allowing printable hBN ionogel inks to be formulated following the addition of an imidazolium ionic liquid and ethyl lactate. The resulting inks are reliably printed with variable patterns and controllable thicknesses by aerosol jet printing, resulting in hBN ionogels that possess high room-temperature ionic conductivities and storage moduli of >3 mS cm−1 and >1 MPa, respectively. By integrating the hBN ionogel with printed semiconductors and electrical contacts, fully-printed thin-film transistors with operating voltages below 1 V are demonstrated on polyimide films. These devices exhibit desirable electrical performance and robust mechanical tolerance against repeated bending cycles, thus confirming the suitability of hBN ionogels for printed and flexible electronics.

36 Claims, 7 Drawing Sheets

(56) References Cited

OTHER PUBLICATIONS

G. Mattana and D. Briand, Recent advances in printed sensors on foil, Mater. Today, 2016, 19, 88-99.
K. Chen, W. Gao, S. Emaminejad, D. Kiriya, H. Ota, H. Y. Y. Nyein, K. Takei and A. Javey, Printed Carbon Nanotube Electronics and Sensor Systems, Adv. Mater., 2016, 28, 4397-4414.
F. C. Krebs, Fabrication and processing of polymer solar cells: A review of printing and coating techniques, Sol. Energy Mater. Sol. Cells, 2009, 93, 394-412.
S. Ito, P. Chen, P. Comte, M. Nazeeruddin, P. Liska, P. Pechy and M. Gratzel, Fabrication of screen-printing pastes from TiO2 powders for dye-sensitised solar cells, Prog. Photovoltaics: Res. Appl., 2007, 15, 603-612.
L. J. Deiner and T. L. Reitz, Inkjet and Aerosol Jet Printing of Electrochemical Devices for Energy Conversion and Storage, Adv. Eng. Mater., 2017, 19, 1600878.
G. Chen, Y. Gu, H. Tsang, D. R. Hines and S. Das, The Effect of Droplet Sizes on Overspray in Aerosol-Jet Printing, Adv. Eng. Mater., 2018, 20, 1701084.
E. B. Secor, Principles of aerosol jet printing, Flex. Print. Electron., 2018, 3, 035002.
K. Wang, Y.-H. Chang, C. Zhang and B. Wang, Conductive-on-demand: Tailorable polyimide/carbon nanotube nanocomposite thin film by dual-material aerosol jet printing, Carbon, 2016, 98, 397-403.
E. Jabari and E. Toyserkani, Aerosol-Jet printing of highly flexible and conductive graphene/silver patterns, Mater. Lett., 2016, 174, 40-43.
B. A. Williams, A. Mahajan, M. A. Smeaton, C. S. Holgate, E. S. Aydil and L. F. Francis, Formation of Copper Zinc Tin Sulfide Thin Films from Colloidal Nanocrystal Dispersions via Aerosol-Jet Printing and Compaction, ACS Appl. Mater. Interfaces, 2015, 7, 11526-11535.
E. Jabari and E. Toyserkani, Micro-scale aerosol-jet printing of graphene interconnects, Carbon, 2015, 91, 321-329.
L. Tu, S. Yuan, H. Zhang, P. Wang, X. Cui, J. Wang, Y.-Q. Zhan and L.-R. Zheng, Aerosol jet printed silver nanowire transparent electrode for flexible electronic application, J. Appl. Phys., 2018, 123, 174905.
J. G. Tait, E. Witkowska, M. Hirade, T.-H. Ke, P. E. Malinowski, S. Steudel, C. Adachi and P. Heremans, Uniform Aerosol Jet printed polymer lines with 30 um width for 140 ppi resolution RGB organic light emitting diodes, Org. Electron., 2015, 22, 40-43.
L. J. Deiner, T. Jenkins, A. Powell, T. Howell and M. Rottmayer, High Capacity Rate Capable Aerosol Jet Printed Li-Ion Battery Cathode, Adv. Eng. Mater., 2019, 21, 1801281.
J. H. Cho, J. Lee, Y. Xia, B. Kim, Y. He, M. J. Renn, T. P. Lodge and D. Frisbie, Printable ion-gel gate dielectrics for low-voltage polymer thin-film transistors on plastic, Nat. Mater., 2008, 7, 900-906.
J. L. Bideau, L. Viau and A. Vioux, Ionogels, ionic liquid based hybrid materials, Chem. Soc. Rev., 2011, 40, 907-925.
S. Wang, B. Hsia, C. Carraroa and R. Maboudian, High-performance all solid-state micro-supercapacitor based on patterned photoresist-derived porous carbon electrodes and an ionogel electrolyte, J. Mater. Chem. A, 2014, 2, 7997-8002.
N. Chen, H. Zhang, L. Li, R. Chen and S. Guo, Ionogel Electrolytes for High-Performance Lithium Batteries: A Review, Adv. Energy Mater., 2018, 8, 1702675.
Z. Jiadi, Y. Yuchao, J. Rundong, L. Zhongxin, Z. Wen, R. Z. Ur, B. Lin, Z. Xiaoxian, C. Yimao, S. Li and H. Ru, Ion Gated Synaptic Transistors Based on 2D van der Waals Crystals with Tunable Diffusive Dynamics, Adv. Mater., 2018, 30, 1800195.
W. J. Hyun, A. C. M. de Moraes, J.-M. Lim, J. R. Downing, K.-Y. Park, M. T. Z. Tan and M. C. Hersam, High-Modulus Hexagonal Boron Nitride Nanoplatelet Gel Electrolytes for Solid-State Rechargeable Lithium-Ion Batteries, ACS Nano, 2019, 13, 9664-9672.
Y. T. Liang and M. C. Hersam, Highly concentrated graphene solutions via polymer enhanced solvent exfoliation and iterative solvent exchange, J. Am. Chem. Soc., 2010, 132, 17661-17663.
A. C. M. de Moraes, W. J. Hyun, J.-W. T. Seo, J. R. Downing, J.-M. Lim and M. C. Hersam, Ion-Conductive, Viscosity- Tunable Hexagonal Boron Nitride Nanosheet Inks, Adv. Funct. Mater., 2019, 29, 1902245.
C. Cao, J. B. Andrews and A. D. Franklin, Completely Printed, Flexible, Stable, and Hysteresis-Free Carbon Nanotube Thin-Film Transistors via Aerosol Jet Printing, Adv. Electron. Mater., 2017, 3, 1700057.
C. Yang, E. Zhou, S. Miyanishi, K. Hashimoto and K. Tajima, Preparation of active layers in Polymer Solar Cells by Aerosol Jet Printing, ACS Appl. Mater. Interfaces, 2011, 3, 4053-4058.
K. Ueno, K. Hata, T. Katakabe, M. Kondoh and M. Watanabe, Nanocomposite Ion Gels Based on Silica Nanoparticles and an Ionic Liquid: Ionic Transport, Viscoelastic Properties, and Microstructure, J. Phys. Chem. B, 2008, 112, 9013-9019.
B. Avvaru, M. N. Patil, P. R. Gogate and A. B. Pandit, Ultrasonic atomization: effect of liquid phase properties, Ultrasonics, 2006, 44, 146-158.
K. Hayamizu, Y. Aihara, H. Nakagawa, T. Nukuda and W. S. Price, Ionic Conduction and Ion Diffusion in Binary Room-Temperature Ionic Liquids Composed of [emim][BF4] and LiBF4, J. Phys. Chem. B, 2004, 108, 19527-19532.
A. Grandjean, M. Malki, C. Simonnet, D. Manara and B. Penelon, Correlation between electrical conductivity, viscosity, and structure in borosilicate glass-forming melts, Phys. Rev. B, 2007, 75, 054112.
Y. Lu, K. Korf, Y. Kambe, Z. Tu and L. A. Archer, Ionic-Liquid-Nanoparticle Hybrid Electrolytes: Applications in Lithium Metal Batteries, Angew. Chem. Int. Ed., 2014, 53, 488-492.
M. Patel, M. Gnanavel and A. J. Bhattacharyya, Utilizing an ionic liquid for synthesizing a soft matter polymer "gel" electrolyte for high rate capability lithium-ion batteries, J. Mater. Chem., 2011, 21, 17419-17424.
Y. Lu, S. S. Moganty, J. L. Schaefer and L. A. Archer, Ionic liquid-nanoparticle hybrid electrolytes, J. Mater. Chem., 2012, 22, 4066-4072.
M. Ha, Y. Xia, A. A. Green, W. Zhang, M. J. Renn, C. H. Kim, M. C. Hersam and C. D. Frisbie, Printed, Sub-3V Digital Circuits on Plastic from Aqueous Carbon Nanotube Inks, ACS Nano, 2010, 4, 4388-4395.
J.-H. Choi, W. Xie, Y. Gu, C. D. Frisbie and T. P. Lodge, Single ion conducting, polymerized ionic liquid triblock copolymer films: high capacitance electrolyte gates for n-type transistors, ACS Appl. Mater. Interfaces, 2015, 7, 7294-7302.
K. Hong, S. H. Kim, K. H. Lee and C. D. Frisbie, Printed, sub-2V ZnO electrolyte gated transistors and inverters on plastic., Adv. Mater., 2013, 25, 3413-3418.
B. Tang, S. P. White, C. D. Frisbie and T. P. Lodge, Synergistic increase in ionic conductivity and modulus of triblock copolymer ion gels, Macromolecules, 2015, 48, 4942-4950.
S. Ogawa, T. Naijo, Y. Kimura, H. Ishii and M. Niwano, Displacement Current Measurement as a Tool to Characterize Organic Field Effect Transistors, Synth. Met., 2005, 153, 253-256.
S. H. Kim, K. Hong, W. Xie, K. H. Lee, S. Zhang, T. P. Lodge and C. D. Frisbie, Electrolyte-gated transistors for organic and printed electronics, Adv. Mater., 2013, 25, 1822-1846.
E. B. Secor, P. L. Prabhumirashi, K. Puntambekar, M. L. Geier and M. C. Hersam, Inkjet Printing of High Conductivity, Flexible Graphene Patterns, J. Phys. Chem. Lett., 2013, 4, 1347-1351.
E. B. Secor, B. Y. Ahn, T. Z. Gao, J. A. Lewis and M. C. Hersam, Rapid and Versatile Photonic Annealing of Graphene Inks for Flexible Printed Electronics, Adv. Mater., 2015, 27, 6683-6688.

\* cited by examiner

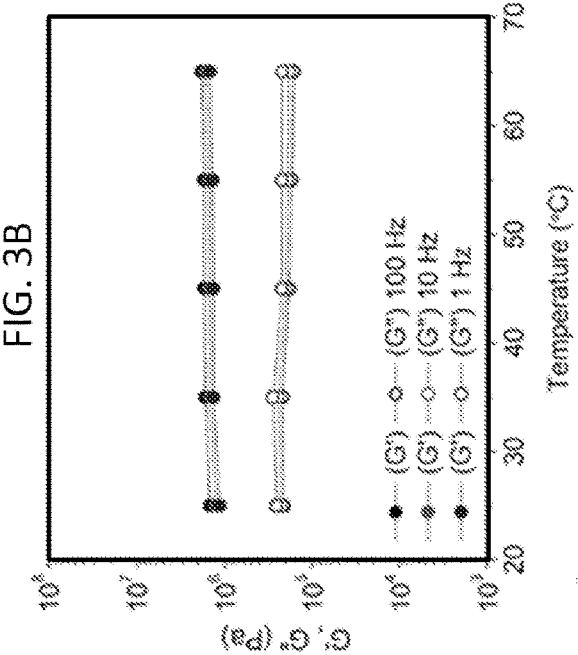
FIG. 3A
FIG. 3B
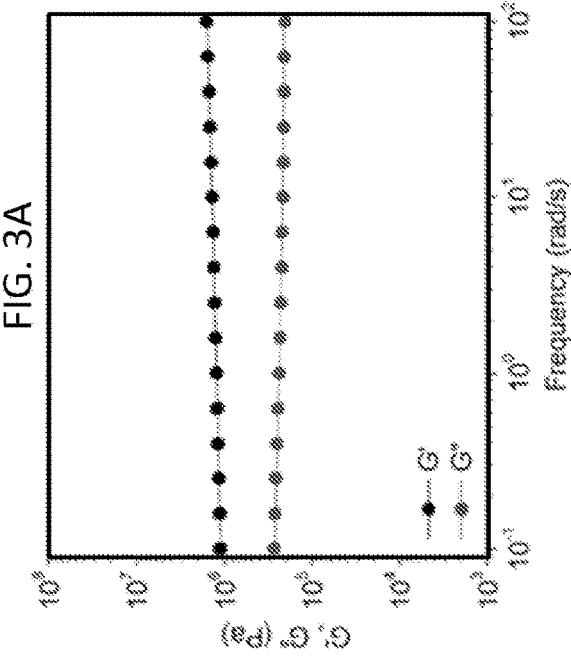
FIG. 3C
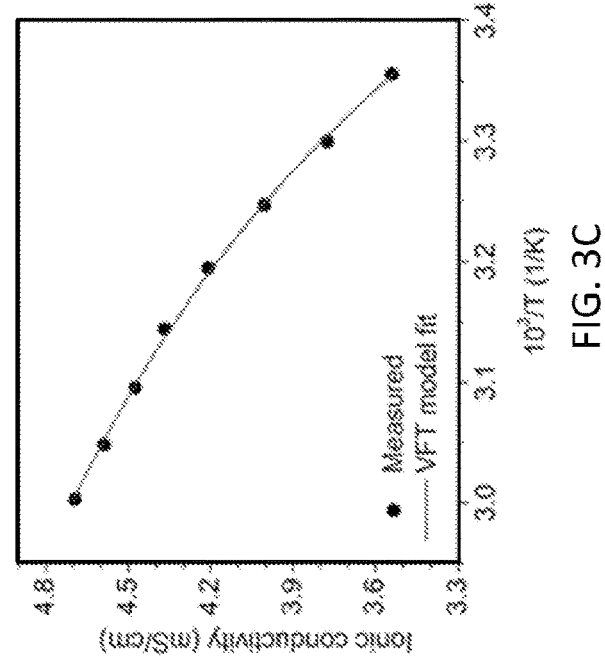
FIG. 3D

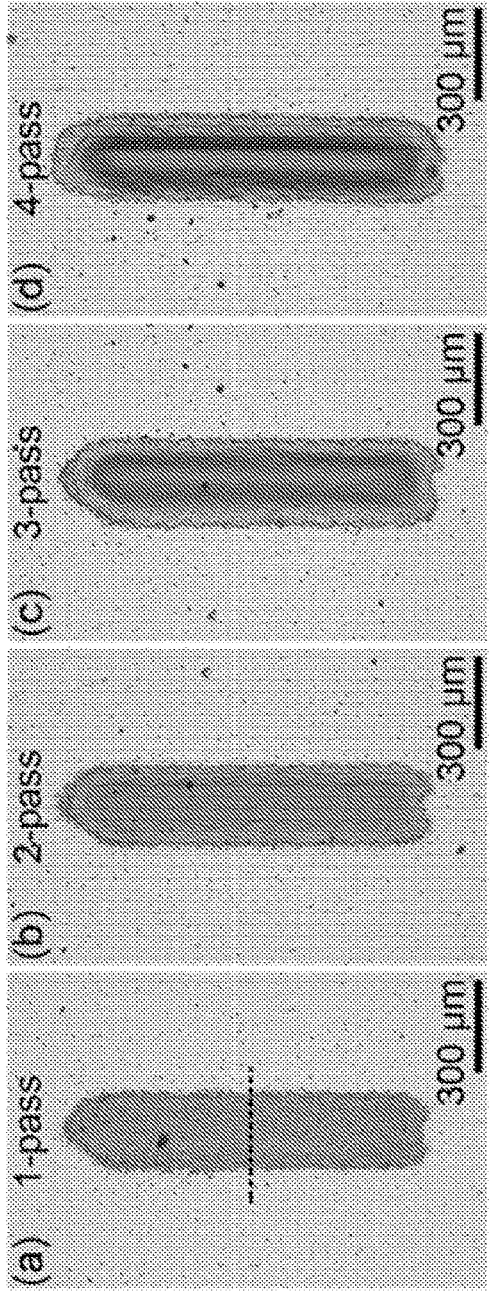
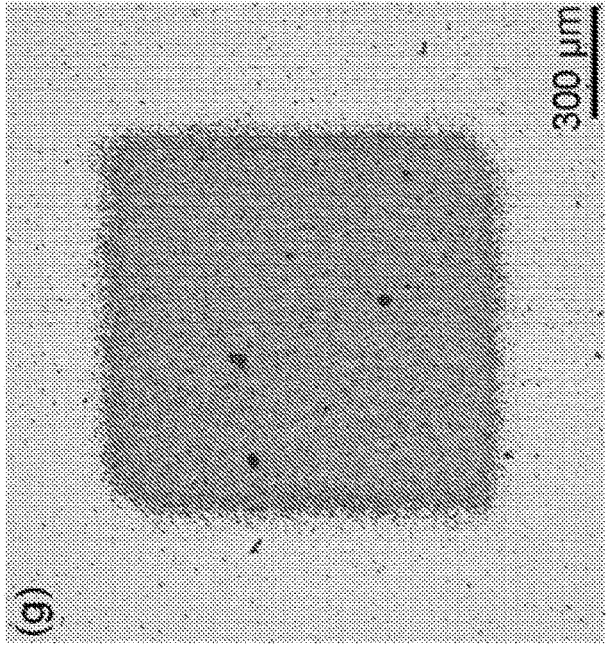
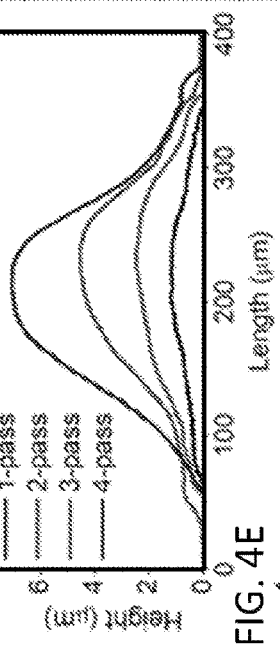
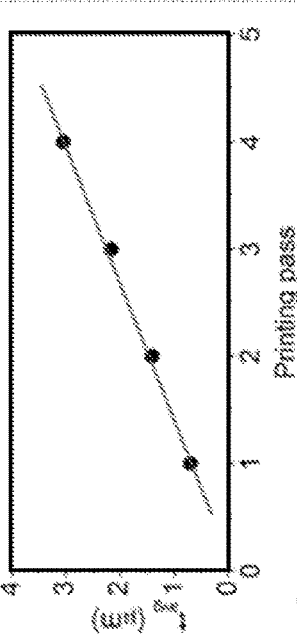
FIG. 4A  FIG. 4B  FIG. 4C  FIG. 4D  FIG. 4E  FIG. 4F  FIG. 4G

PRINTABLE IONOGEL INKS AND FORMING METHODS AND APPLICATIONS OF SAME

CROSS-REFERENCE TO RELATED PATENT APPLICATION

This application claims priority to and the benefit of U.S. Provisional Application No. 62/975,282, filed Feb. 12, 2020, which is incorporated herein in its entirety by reference.

STATEMENT AS TO RIGHTS UNDER FEDERALLY-SPONSORED RESEARCH

This invention was made with government support under 70NANB19H005 awarded by the National Institute of Standards and Technology, 1727846 and 1720139 awarded by the National Science Foundation, and DE-AC02-06CH11357 awarded by the Department of Energy. The government has certain rights in the invention.

FIELD OF THE INVENTION

The present invention relates generally to materials, and more particularly to printable ionogel inks, forming methods and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Additive manufacturing based on high-resolution printing enables the production of electronic devices with minimal materials waste and low cost for a diverse set of applications including displays, distributed sensing, smart packaging, and energy management. In addition, printing processes are compatible with roll-to-roll production schemes and flexible substrates, offering promise for high-throughput manufacturing of bendable and wearable devices. Among the range of additive manufacturing methods, aerosol jet printing has recently attracted considerable attention for printed electronics. In this process (FIG. 1), a functional ink is aerosolized by an ultrasonic or pneumatic atomizer, and the aerosol droplets are delivered to the deposition head by a carrier gas flow. When the aerosol droplets pass through the nozzle of the deposition head, a coaxial sheath gas aerodynamically focuses the aerosol stream, enabling high-resolution deposition with minimal risk of nozzle clogging. Aerosol jet printing has the additional advantage of relaxed rheological constraints on ink design, including compatibility with a wide range of ink viscosities (1-1000 mPa s). Furthermore, aerosol jet printing facilitates the deposition of functional materials on nonplanar surfaces because the nozzle can be placed with a long standoff distance (1-5 mm) from the substrate. Due to these compelling advantages, it would be of significance to develop aerosol-jet-printable inks and explore printed electronics applications for aerosol jet printing.

Hexagonal boron nitride (hBN) is considered as a promising solid matrix material for ionogel inks due to its excellent chemical/thermal stability and mechanical robustness. While bulk hBN ionogel inks have been employed in macroscopic applications such as lithium-ion batteries, hBN ionogel inks that are compatible with high-resolution printing have not yet been realized.

Therefore, a heretofore unaddressed need exists in the art to address the aforementioned deficiencies and inadequacies.

SUMMARY OF THE INVENTION

One of the objectives of this invention is to provide aerosol-jet-printable ionogel inks that are compatible with high-resolution printing.

In one aspect of the invention, the printable ionogel ink comprises an ionic liquid; and a solid matrix material mixed with the ionic liquid in at least one solvent, wherein the ionic liquid comprises 1-ethyl-3-methylimidazolium bis(trifluoromethylsulfonyl)imide (EMIM-TFSI), and the solid matrix material comprises exfoliated hexagonal boron nitride (hBN) nanoplatelets. In one embodiment, the surface of each of the exfoliated hBN nanoplatelets has a thin amorphous carbon coating.

In one embodiment, a ratio of the exfoliated hBN nanoplatelets to the EMIM-TFSI is about 1:2 by weight.

In one embodiment, a solid loading of the exfoliated hBN nanoplatelets to the EMIM-TFSI is about 33%.

In one embodiment, a concentration of the exfoliated hBN nanoplatelets to the EMIM-TFSI in the at least one solvent is about 120 mg mL$^{-1}$.

In one embodiment, the at least one solvent comprises a single solvent including ethyl lactate, cyclohexanone, terpineol, ethylene glycol, ethanol, isopropanol, or butanone.

In one embodiment, the printable ionogel ink has a viscosity that is tunable by a shear rate, wherein the ink viscosity decreases as the shear rate increases.

In one embodiment, the printable ionogel ink has a storage modulus (G') that is higher than its loss modulus (G"), revealing the reliable solid-like behavior of the ionogel ink.

In another aspect of the invention, the printable ionogel ink comprises an ionic liquid; and a solid matrix material, where the solid matrix material is mixed with the ionic liquid in at least one solvent.

In one embodiment, a ratio of the solid matrix material to the ionic liquid is about 1:2 by weight.

In one embodiment, a solid loading of the solid matrix material and the ionic liquid is about 20-50%.

In one embodiment, a concentration of the solid matrix material and the ionic liquid in the at least one solvent is about 90-150 mg mL$^{-1}$.

In one embodiment, the printable ionogel ink has a viscosity that is tunable by a shear rate, wherein the ink viscosity decreases as the shear rate increases.

In one embodiment, the printable ionogel ink has a storage modulus (G') that is higher than its loss modulus (G"), revealing the reliable solid-like behavior of the ionogel ink. In one embodiment, the solid-like behavior (G'>G") persists at temperatures in excess of about 40° C.

In one embodiment, the printable ionogel ink has ionic conductivity that increases with temperature.

In one embodiment, the ionic liquid comprises EMIM-TFSI, ammonium, imidazolium, pyrrolidinium, pyridinium, piperidinium, phosphonium, sulfonium-based ionic liquids, or a combination of them.

In one embodiment, the at least one solvent comprises a single solvent including ethyl lactate, cyclohexanone, terpineol, ethylene glycol, ethanol, isopropanol, or butanone.

In one embodiment, the solid matrix material comprises boron nitride nanosheets (BNNS), borocarbonitrides (BCN), oxide nanosheets, layered perovskites, hydroxide nanosheets including hydrotalcite-like layered double hydroxides, natural clays including bentonites and montmorillonites, or a combination of them.

In one embodiment, the BNNS comprises hexagonal boron nitride (hBN) nanoplatelets that are obtained from bulk hBN by scalable solution exfoliation.

In one embodiment, the surface of each of the exfoliated hBN nanoplatelets has a thin amorphous carbon coating.

In one embodiment, the oxide nanosheets comprises $Al_2O_3$, $TiO_2$ (anatase and rutile), $ZrO_2$, $Nb_2O_5$, $HfO_2$, $CCu_3Ti_4O_{12}$, $Pb(Zr,Ti)O_3$, $(Pb,La)(Zr, Ti)O_3$, $SiO_2$, $HfSiO_4$, $La_2O_3$, $LaAlO_3$, $BaTiO_3$, $SrTiO_3$, $Ta_2O_5$, or a combination of them.

In another aspect, the invention relates to a device comprising one or more components formed of the ionogel ink as disclosed above.

In one embodiment, the device can be one or more batteries, one or more supercapacitors, one or more transistors, one or more neuromorphic computing devices, one or more flexible electronics, one or more printed electronics, or any combination of them.

In yet another aspect, the invention relates to a method for forming a printable ionogel ink comprising providing an ionic liquid and a solid matrix material; and mixing the solid matrix material with the ionic liquid in at least one solvent.

In one embodiment, a ratio of the solid matrix material to the ionic liquid is about 1:2 by weight.

In one embodiment, a solid loading of the solid matrix material and the ionic liquid is about 20-50%.

In one embodiment, a concentration of the solid matrix material and the ionic liquid in the at least one solvent is about 90-150 mg mL$^{-1}$.

In one embodiment, the printable ionogel ink has a viscosity that is tunable by a shear rate, wherein the ink viscosity decreases as the shear rate increases.

In one embodiment, the printable ionogel ink has a storage modulus (G') that is higher than its loss modulus (G"), revealing the reliable solid-like behavior of the ionogel ink. In one embodiment, the solid-like behavior (G'>G") persists at temperatures in excess of about 40° C.

In one embodiment, the printable ionogel ink has ionic conductivity that increases with temperature.

In one embodiment, the ionic liquid comprises EMIM-TFSI, ammonium, imidazolium, pyrrolidinium, pyridinium, piperidinium, phosphonium, sulfonium-based ionic liquids, or a combination of them.

In one embodiment, the at least one solvent comprises a single solvent including ethyl lactate, cyclohexanone, terpineol, ethylene glycol, ethanol, isopropanol, or butanone.

In one embodiment, the solid matrix material comprises BNNS, BCN, oxide nanosheets, layered perovskites, hydroxide nanosheets including hydrotalcite-like layered double hydroxides, natural clays including bentonites and montmorillonites, or a combination of them.

In one embodiment, the oxide nanosheets comprises $Al_2O_3$, $TiO_2$ (anatase and rutile), $ZrO_2$, $Nb_2O_5$, $HfO_2$, $CaCu_3Ti_4O_{12}$, $Pb(Zr,Ti)O_3$, $(Pb,La)(Zr, Ti)O_3$, $SiO_2$, $HfSiO_4$, $La_2O_3$, $LaAlO_3$, $BaTiO_3$, $SrTiO_3$, $Ta_2O_5$, or a combination of them.

In one embodiment, the BNNS comprises hexagonal boron nitride (hBN) nanoplatelets that are obtained by shear-mixing bulk hBN microparticles in ethanol with ethyl cellulose (EC) acting as the dispersing agent to form a shear-mixed dispersion; separating the exfoliated hBN nanoplatelets and EC from the shear-mixed dispersion by centrifuge-assisted sedimentation and flocculation; and collecting hBN/EC solids; and heating the collected hBN/EC solids at a temperature for a period of time to decompose the EC stabilizer, thereby volatilizing most of the EC, but also leaving behind a thin amorphous carbon coating on the surface of each of the exfoliated hBN nanoplatelets, which contributes to enhanced interactions between the hBN nanoplatelets and the ionic liquids for stronger solidification of the ionogel ink.

In one embodiment, the temperature is about 300-500° C., and the period of time is for about 2-4 hours.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIGS. 3A-3D show characterization of the hBN ionogel according to embodiments of the invention. FIG. 3A: Storage (G') and loss (G") moduli of the printable hBN ionogel (33% hBN solid loading) as a function of frequency at 25° C. FIG. 3B: G' and G" of the hBN ionogel at various temperatures. FIG. 3C: Temperature dependence of the ionic conductivity of the hBN ionogel (33% hBN solid loading). The black data points are the measured ionic conductivity values, and the red curve is a Vogel-Fulcher-Tammann (VFT) model fit. FIG. 3D: G' and ionic conductivity of the hBN ionogels with various hBN solid loadings, and their comparison to previously reported ionogels based on a triblock copolymer, poly(styrene-b-ethyl acrylate-b-styrene) (SEAS).

FIGS. 4A-4G show characterization of the hBN ionogel according to embodiments of the invention. FIGS. 4A-4D:

Optical microscopy images of printed hBN ionogels with (FIG. 4A) 1, (FIG. 4B) 2, (FIG. 4D) 3, and (FIG. 4D) 4 printing passes on a polyimide film. FIG. 4E: Cross-sectional profiles of the printed hBN ionogels as a function of the number of printing passes, taken along the dotted line in FIG. 4A. FIG. 4F: Average thickness ($t_{avg}$) of the printed hBN ionogels as a function of the number of printing passes. FIG. 4G: Optical microscopy image of a printed hBN ionogel with a 1 mm×1 mm square pattern on a polyimide film.

FIG. 6A: Representative $I_D^{1/2}$–$V_G$ characteristic for the printed TFTs. FIG. 6B: $I_G$–$V_G$ characteristics measured at various sweep rates. $I_G$ indicates gate current measured with source and drain contacts grounded. FIG. 6C: Plot of $I_G$ as a function of the sweep rate at $V_G$ of −0.2 V. Histograms of (FIG. 6D) charge carrier mobility (μ), (FIG. 6E) threshold voltage ($V_{th}$), and (FIG. 6F) on/off-current ratio ($I_{on}/I_{off}$) for 20 devices.

DETAILED DESCRIPTION OF THE INVENTION

Figure 1:
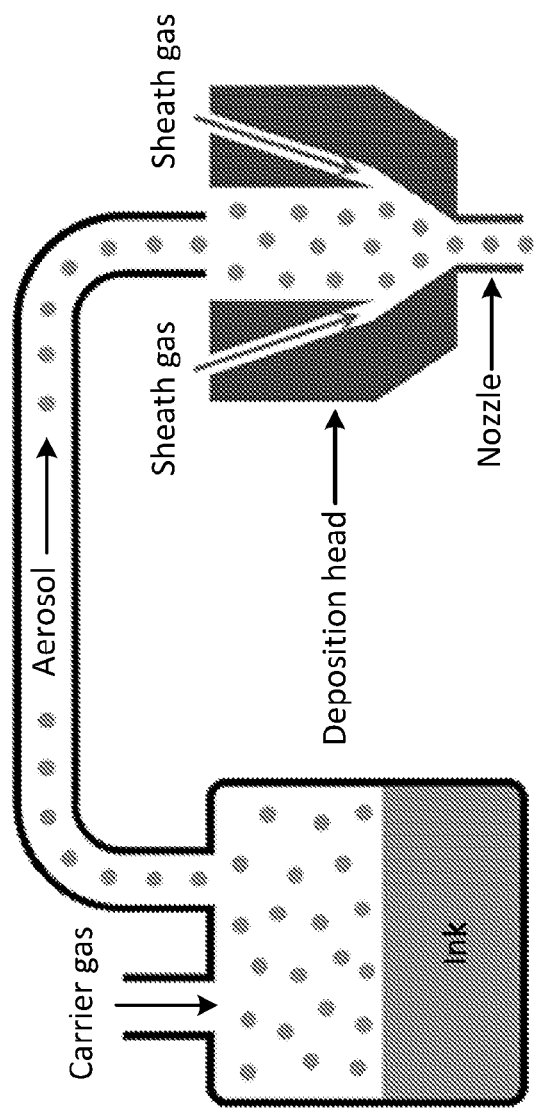
FIG. 1 shows schematic of aerosol jet printing. The carrier gas flow delivers the aerosolized ink to the deposition head, and the sheath gas flow focuses the aerosol stream to achieve well-defined patterning.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Ionogels are solid-state electrolytes based on ionic liquids and gelling solid matrices, which have been employed for a variety of applications including transistors, supercapacitors, batteries, and neuromorphic computing devices. Ionic liquids offer several desirable features as an electrolyte including nonflammability, negligible vapor pressure, and high thermal and electrochemical stability. Moreover, combining ionic liquids with a gelling solid matrix leads to a solid-state electrolyte that is mechanically robust and flexible with minimal leakage problems, as is needed for flexible electronics. Recently, hexagonal boron nitride (hBN) nanoplatelets have been introduced as a promising solid matrix for ionogels. As a solid matrix material, hBN possesses several beneficial attributes such as electrically insulating character, chemical inertness, thermal stability, and mechanical robustness. Furthermore, compared to conventional bulk hBN microparticles, the smaller particle size of hBN nanoplatelets enables significant enhancement of ionogel mechanical strength without compromising ionic conductivity. While these initial results are promising, the current hBN ionogel formulations are not compatible with the high-resolution and high-throughput additive manufacturing methods that are used for printed electronics.

In one aspect of the invention, the printable ionogel ink includes an ionic liquid; and a solid matrix material mixed with the ionic liquid in at least one solvent, where the ionic liquid comprises 1-ethyl-3-methylimidazolium bis(trifluoromethylsulfonyl)imide (EMIM-TFSI), and the solid matrix material comprises exfoliated hexagonal boron nitride (hBN) nanoplatelets.

In some embodiments, a ratio of the exfoliated hBN nanoplatelets to the EMIM-TFSI is about 1:2 by weight. The solid loading of the exfoliated hBN nanoplatelets to the EMIM-TFSI is about 33%. The concentration of the exfoliated hBN nanoplatelets to the EMIM-TFSI in the at least one solvent is about 120 mg mL$^{-1}$.

In some embodiments, the at least one solvent comprises a single solvent including ethyl lactate, cyclohexanone, terpineol, ethylene glycol, ethanol, isopropanol, or butanone.

In some embodiments, the exfoliated hBN nanoplatelets are produced from bulk hBN powders by liquid-phase exfoliation, allowing printable hBN ionogel inks to be formulated following the addition of an imidazolium ionic liquid and ethyl lactate. The resulting inks are reliably printed with variable patterns and controllable thicknesses by aerosol jet printing, resulting in hBN ionogels that possess high room-temperature ionic conductivities of greater than about 3 mS cm$^{-1}$ and storage moduli of greater than about 1 MPa. In some embodiments, the printable ionogel ink has a viscosity that is tunable by a shear rate, wherein the ink viscosity decreases as the shear rate increases. In some embodiments, the printable ionogel ink has a storage modulus (G') that is higher than its loss modulus (G''), revealing the reliable solid-like behavior of the ionogel ink.

Specifically, the hBN nanoplatelets are scalably solution-exfoliated from bulk hBN and then mixed with EMIM-TFSI and ethyl lactate to formulate printable inks. The resulting printable hBN ionogels exhibit high ionic conductivities and mechanical strengths (i.e., storage moduli) of greater than about 3 mS cm$^{-1}$ and greater than about 1 MPa, respectively, at about 25° C. Moreover, reliable printing is demonstrated using a standard aerosol jet printer and polyimide substrates. Finally, fully-printed thin-film transistors (TFTs) with the hBN ionogel as the dielectric on polyimide substrates show exemplary transfer and output characteristics in addition to excellent mechanical tolerance to bending.

Figure 2B:
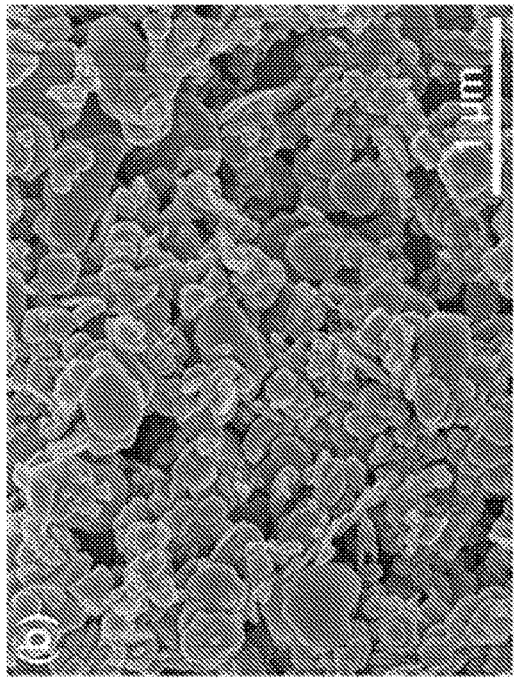
FIGS. 2A-2B show respectively a photograph and scanning electron microscopy image of exfoliated hexagonal boron nitride (hBN) nanoplatelets according to embodiments of the invention.
Figure 2D:
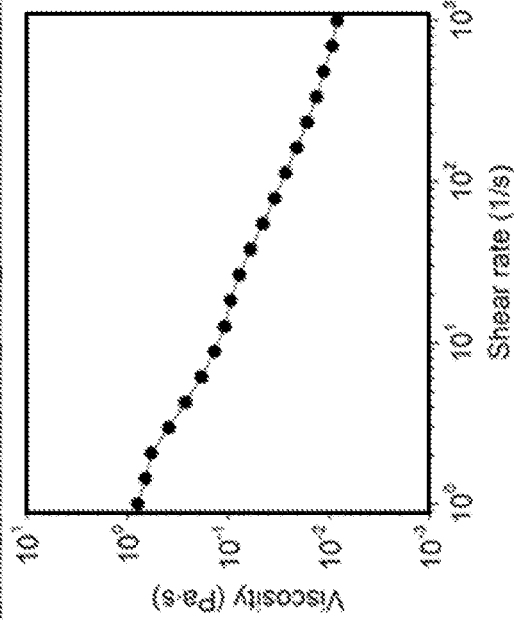
FIG. 2D shows viscosity of the hBN ionogel ink as a function of shear rate at 25° C. according to embodiments of the invention.
Figure 2A:
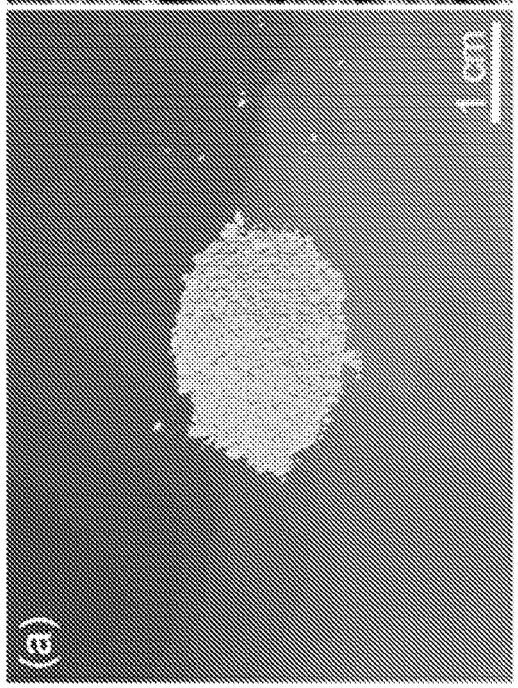
Figure 2C:
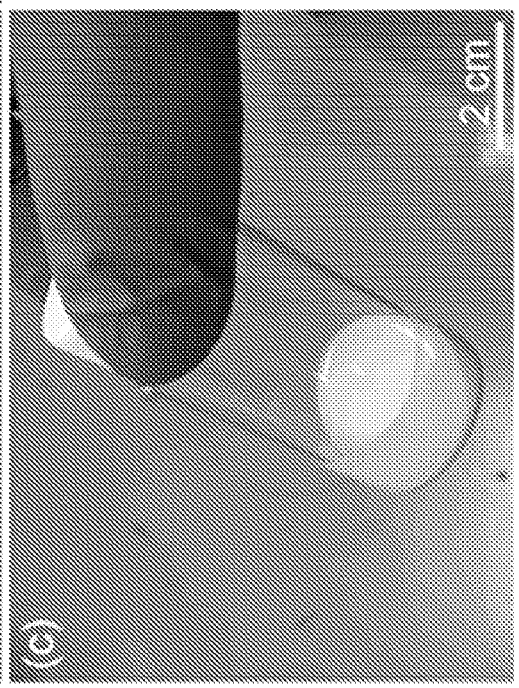
FIG. 2C shows a photograph of a vial of the ionogel ink prepared with the hBN nanoplatelets according to embodiments of the invention.

FIGS. 2A and 2B show a photograph and a scanning electron microscopy image, respectively, of the exfoliated hBN nanoplatelets that are used in the formulation of the printable hBN ionogels. For the exfoliation of hBN nanoplatelets, bulk hBN microparticles were shear-mixed in ethanol with ethyl cellulose (EC) acting as the dispersing agent. The exfoliated hBN nanoplatelets and EC were separated from the shear-mixed dispersion by centrifuge-assisted sedimentation and flocculation. The collected hBN/EC solids were then heated at about 400° C. for about 3 hours in air to decompose the EC stabilizer. This annealing process volatilizes most of the EC, but also leaves behind a thin amorphous carbon coating on the surface of each of the exfoliated hBN nanoplatelets, which contributes to enhanced interactions between the hBN nanoplatelets and ionic liquids for stronger solidification of ionogels. Importantly for dielectric applications, the amorphous carbon coating is electrically insulating and thus does not cause unwanted leakage currents. To formulate a printable hBN ionogel ink shown in FIG. 2C, the exfoliated and annealed hBN nanoplatelets were mixed with EMIM-TFSI and ethyl lactate. The ratio between the hBN nanoplatelets and ionic liquid was about 1:2 by weight to achieve about 33% hBN solid loading of the ionogel (i.e., hBN and ionic liquid), and the concentration of the ionogel in ethyl lactate was about 120 mg mL$^{-1}$.

In general, inks for aerosol jet printing are designed with the addition of a low-volatility co-solvent (≤10%), such as terpineol or 1,8-octanedithiol. Without the low-volatility co-solvent, aerosol droplets quickly lose solvent during transport from the ink container to the deposition head by the carrier gas flow, leading to poor morphology of the printed features. In contrast, the hBN ionogel ink only required a single solvent since the nonvolatile ionic liquid eliminates the need for an additional low-volatility co-solvent for effective printability. FIG. 2D shows the viscosity of the prepared hBN ionogel ink as a function of shear rate at about 25° C. The ink viscosity decreases as the shear rate increases, which can be attributed to the disruption of the interactions between the hBN nanoplatelets and the ionic liquid with increasing shear stress. This shear thinning behavior is favorable for aerosol jet printing with an ultrasonic atomizer because inks experience high shear rates when generating aerosol droplets from a bulk liquid by ultrasonication. Hence, inks with shear thinning behavior require lower ultrasonic power for atomization, compared to Newtonian inks with a similar viscosity at low shear rates.

The mechanical properties and ionic conductivity of the printable hBN ionogel were characterized after evaporating ethyl lactate at a temperature (about 160° C.) that is higher than the boiling point (about 154° C.) of the solvent. As shown in FIG. 3A, the hBN ionogel (about 33% hBN solid loading) at about 25° C. exhibits a storage modulus (G') higher than its loss modulus (G") over the entire measured frequency range, revealing the reliable solid-like behavior of the hBN ionogel. This solid-like behavior (G'>G") persists at temperatures in excess of about 60° C. due to the strong solidification of the hBN ionogel, as shown in FIG. 3B. In addition, the ionic conductivity of the hBN ionogel (about 33% hBN solid loading) is about 3.4±0.4 mS cm$^{-1}$ at about 25° C., and increases (FIG. 3C) with temperature in agreement with the Vogel-Fulcher-Tammann (VFT) model that correlates the ion conduction behavior with free volume and configurational entropy. The VFT model is expressed as:

$$\sigma = \sigma_0 \exp\left(-\frac{B}{T-T_0}\right)$$

where $\rho_0$, B, and $T_0$ are the pre-exponential factor equivalent to the ionic conductivity at infinite temperature, the pseudo-activation energy term related to the entropic barrier to ion motion, and the ideal glass transition temperature at which the free volume disappears, respectively. The parameters used for the VFT model curve (solid line in FIG. 3C) are about 6.3 mS cm$^{-1}$, about 20 K, and about 263 K for $\rho_0$, B, and $T_0$, respectively, resulting in a fit to the experimental data (data points in FIG. 3C) with a coefficient of determination ($R^2$) higher than about 0.99.

FIG. 3D shows the mechanical strength (G') and ionic conductivity of the printable hBN ionogels for different hBN solid loadings. The printable hBN ionogels present a tradeoff between the mechanical strength and ionic conductivity as the hBN solid loading is varied. This tradeoff is typical for ionogels because increased solid loading enhances mechanical support but impedes ion motion. Moreover, FIG. 3D compares the mechanical strength and ionic conductivity of the printable hBN ionogels to previously reported printable ionogels based on triblock copolymer solid matrices. Printable ionogels based on triblock copolymers have been extensively developed due to their high ionic conductivity and printability, although they typically suffer from poor mechanical strength. To address this issue, one research group reported enhanced mechanical strength and ionic conductivity of printable ionogels based on poly(styrene-b-ethyl acrylate-b-styrene) (SEAS) and EMIM-TFSI ionic liquid by engineering the midblock chain of the triblock copolymer. However, FIG. 3D shows that the printable hBN ionogels outperform even the SEAS-based ionogels, indicating that the exfoliated hBN nanoplatelets are a promising solid matrix to concurrently achieve high mechanical strength and ionic conductivity.

To explore printability, the hBN ionogel ink (about 33% hBN solid loading) was printed using a commercially available aerosol jet printer with a nozzle size of about 300 μm in diameter. The printing was performed on polyimide films without any surface pretreatment, and the substrate temperature was maintained at about 60° C. during printing to promote ink drying. FIG. 4A displays an optical microscopy image of the printed hBN ionogel after 1 printing pass, showing a line width of about 280 μm and effective wetting on the polyimide substrate. As the number of printing passes increases, as shown in FIGS. 4B-4D, it is evident that the printed hBN ionogel layer increases in thickness, while the line width remains relatively constant, indicating minimal spreading of the hBN ionogel with a progressive number of printing passes. Similarly, FIG. 4E shows surface profiles of the printed hBN ionogels with different printing passes, which were taken along the dotted line in FIG. 4A by a laser confocal microscope. The surface profiles reveal convex cross-sections of the hBN ionogels with a densely-deposited core region. As shown in FIG. 4F, the average thickness is linearly proportional to the number of printing passes, implying that the hBN ionogels are deposited homogeneously for each printing pass. In addition to the line features, an about 1 mm×1 mm square pattern of the hBN ionogel was printed by successively depositing about 1 mm long lines with a pitch of about 50 μm. FIG. 4G shows an optical microscopy image of the deposited square pattern with minimal thickness variation, thus revealing uniform hBN ionogel printing over large areas.

Figure 5A:
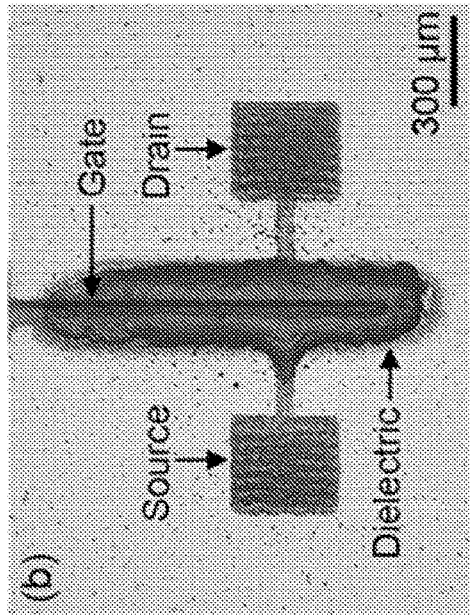
FIGS. 5A-5B show respectively schematic and optical microscopy image of a fully-printed thin-film transistor (TFT) with the hBN ionogel dielectric on a polyimide film according to embodiments of the invention.
Figure 5B:
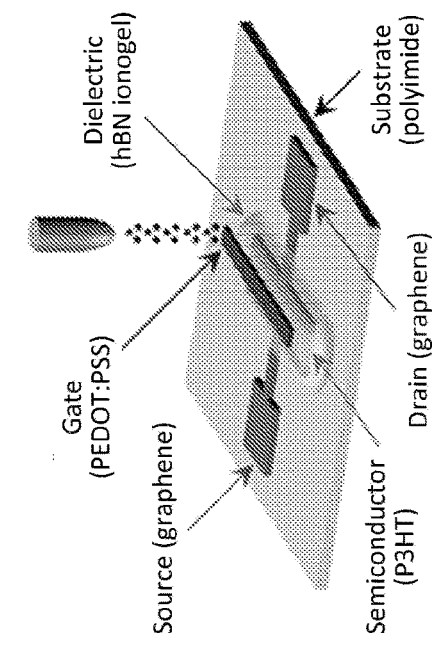

To demonstrate the utility of the hBN ionogels in printed electronics, fully-printed thin-film transistors (TFTs) using the hBN ionogel as the dielectric were fabricated on flexible substrates by aerosol jet printing, as shown in FIG. 5A. Ionogels are a favorable dielectric for flexible printed TFTs because the electrolytes offer high tolerance to thickness variations and desirable mechanical flexibility without leakage issues. Moreover, the high double-layer capacitance of ionogel electrolytes enable low-voltage operation for low-power and portable devices. To fabricate the TFTs shown in FIG. 5B, graphene was first deposited on polyimide films for the source and drain electrodes with a channel width and length of about 700 μm and about 70 μm, respectively. Poly(3-hexylthiophene) (P3HT) was then printed to form the semiconducting channel, and the hBN ionogel dielectric was deposited on the semiconducting channel. Finally, poly(3,4-ethylenedioxythiophene):poly(styrene sulfonate) (PEDOT:PSS) was printed onto the hBN ionogel dielectric as the gate electrode to complete the devices. The entire device fabrication and subsequent characterization were executed in ambient conditions, and the fabricated devices were annealed at about 160° C. preceding electrical measurements to remove sequestered solvent.

Figure 5C:
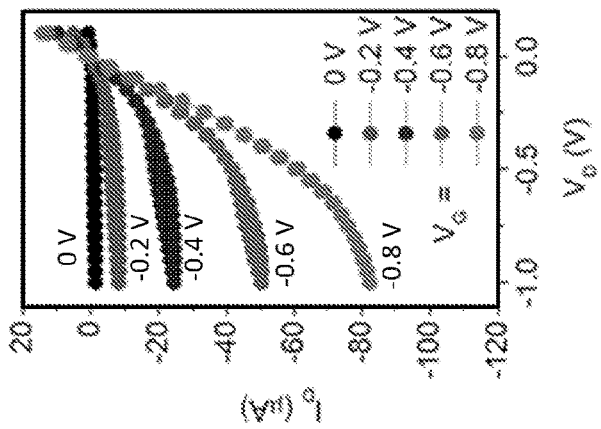
FIGS. 5C-5D show respectively representative transfer and output characteristics for the printed TFT according to embodiments of the invention. $I_D$, $V_D$, and $V_G$ denote drain current, drain voltage, and gate voltage, respectively. The TFT channel width and length were 700 and 70 μm, respectively. The voltage sweep rate and $V_D$ for the transfer curves were 0.1 V s$^{-1}$ and −1 V, respectively.
Figure 5D:
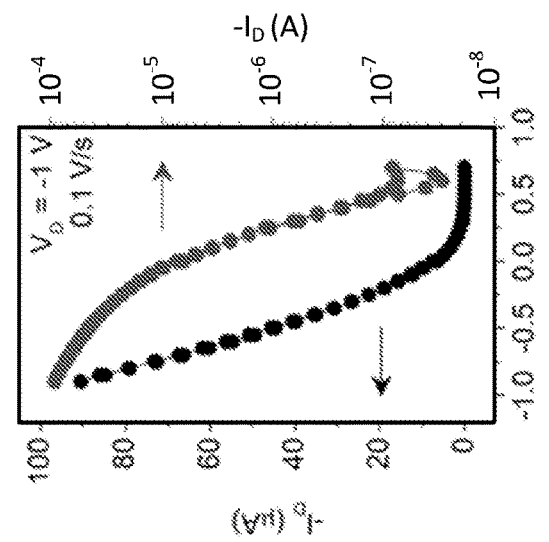

By integrating the hBN ionogel with printed semiconductors and electrical contacts, fully-printed thin-film transistors with operating voltages below 1 V are demonstrated on polyimide films. FIG. 5C shows a representative transfer characteristic of the fabricated TFTs at a sweep rate of about 100 mV s$^{-1}$ and a drain voltage ($V_D$) of about −1 V. In the TFTs with the hBN ionogel dielectric, the drain current ($I_D$) is low at positive gate voltage ($V_G$) because the p-type semiconducting channel is depleted. However, $I_D$ increases at negative $V_G$ since anions in the ionogel dielectric are driven into the polymer semiconductor and compensate induced charge carriers in the TFT channel. This electrolytic gating enables the devices to operate with small $V_G$ (less than 1 V), and the negligible hysteresis between forward and backward sweeps can be attributed to the fast response of the ions in the hBN ionogel dielectric to $V_G$. Furthermore, the output curves (FIG. 5D) obtained at various $V_G$ display the expected $I_D$ modulation with linear and saturation regimes at low and high $V_D$, respectively, demonstrating well-behaved operation of the fully-printed TFTs with the hBN ionogel dielectric.

Figure 6A:
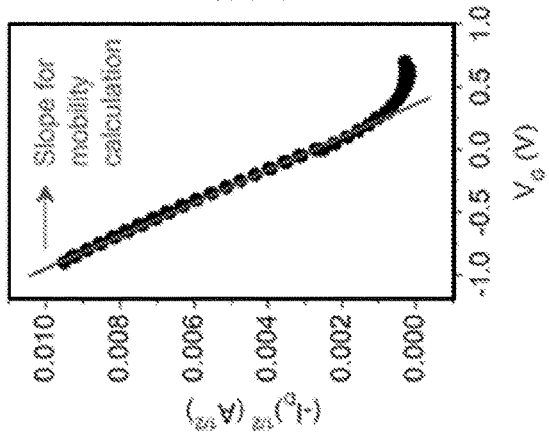
FIGS. 6A-6F show characterization of the printed TFTs according to embodiments of the invention.
Figure 6B:
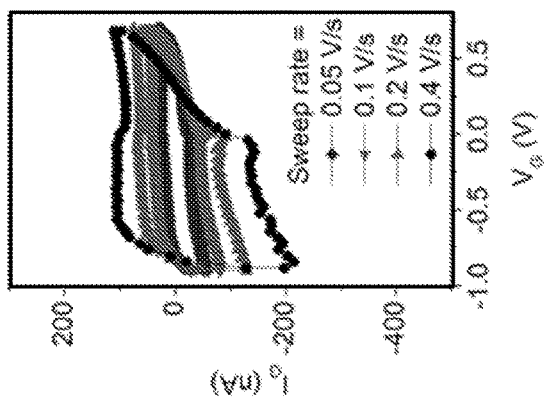
Figure 6C:
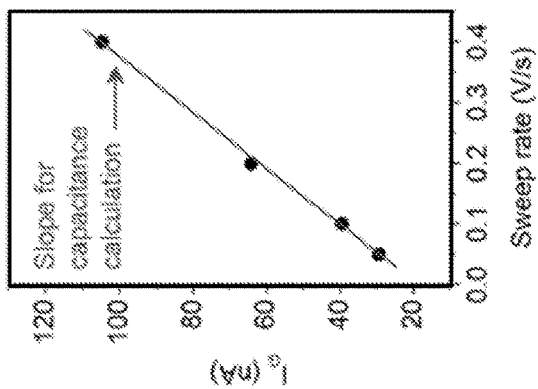
Figure 6D:
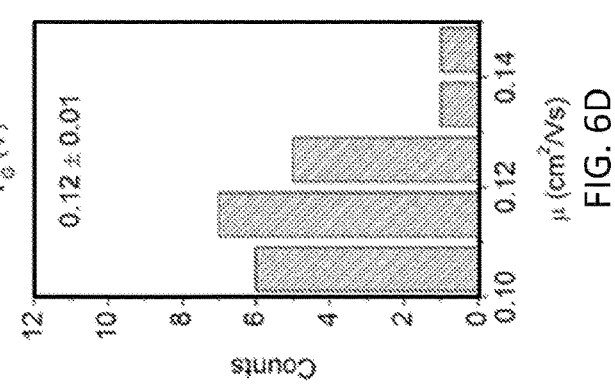
Figure 6E:
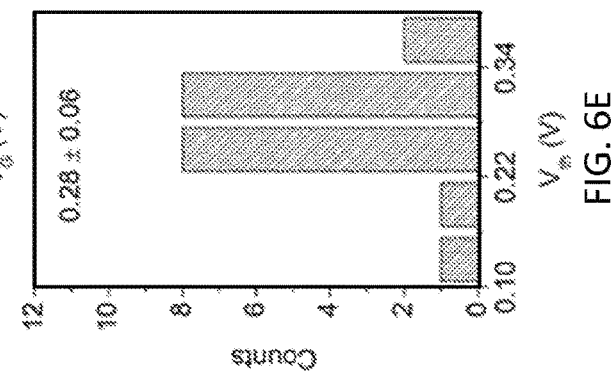
Figure 6F:
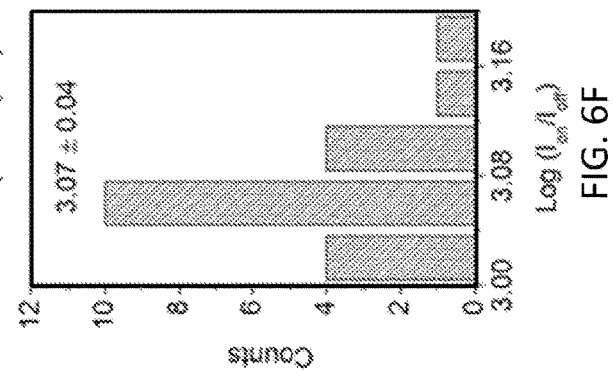

The charge carrier mobility (μ) and the threshold voltage ($V_{th}$) of the fabricated TFTs were calculated by fitting plots shown in FIG. 6A of the square-root drain current ($I_D^{1/2}$) as a function of $V_G$, according to the standard saturation regime relation:

$$I_D = \mu C_i \frac{W}{2L}(V_G - V_{th})^2$$

where $C_i$ is the specific capacitance of the ionogel dielectric, W is the width (about 700 μm) of the semiconducting channel, and L is the length (about 70 μm) of the semiconducting channel. $C_i$ was estimated to be about 108 μF cm$^{-2}$ by displacement current measurements, in which the gate current ($I_G$) was measured with source and drain contacts grounded at different sweep rates. FIG. 6B displays $I_G$–$V_G$ characteristics of a representative device at sweep rates between about 0.05 V s$^{-1}$ and about 0.4 V s$^{-1}$, and FIG. 6C shows the plot of $I_G$ as a function of the sweep rate at $V_G$ of about −0.2 V for the capacitance calculation. Twenty TFTs were fabricated to evaluate statistical distributions of the device metrics. All of the devices were functional with μ (FIG. 6D), $V_{th}$ (FIG. 6E), and on/off-current ratio ($I_{on}/I_{off}$, FIG. 6F) of the 20 devices measured to be 0.12±0.01 cm$^2$ V$^{-1}$ s$^{-1}$, 0.28±0.06 V, and $10^{3.07\pm0.04}$, respectively. This excellent fabrication yield and minimal variation in the device metrics confirm the high reliability of the printable hBN ionogel for TFT-based printed electronics.

Figure 7C:
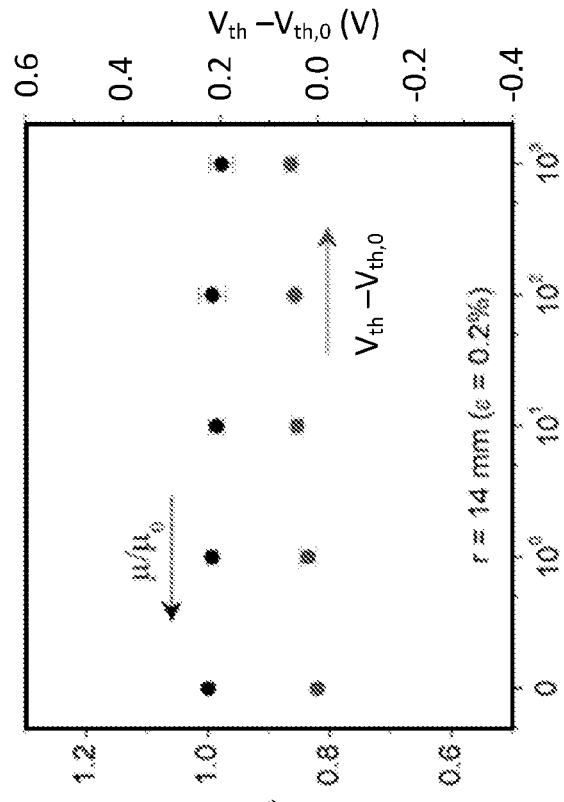
FIG. 7C shows arlative mobility (μ/μ$_0$) and threshold voltage change ($V_{th}$–$V_{th,0}$) after repeated bending cycles of the printed TFTs according to embodiments of the invention. The bending radius (r) was 14 mm, corresponding to a tensile strain (E) of 0.2%.
Figure 7A:
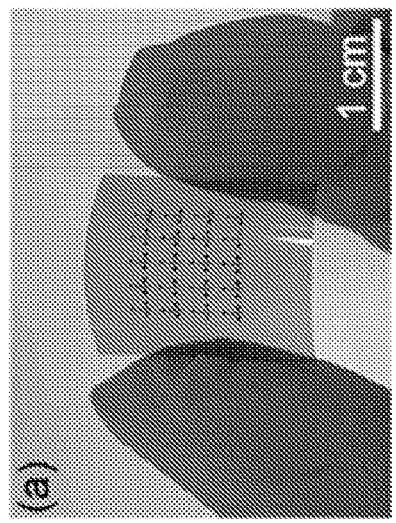
FIGS. 7A-B show respectively a photograph of a 4×5 array of fully-printed TFTs on a polyimide film and schematic of the bending test for the printed TFTs according to embodiments of the invention.
Figure 7B:
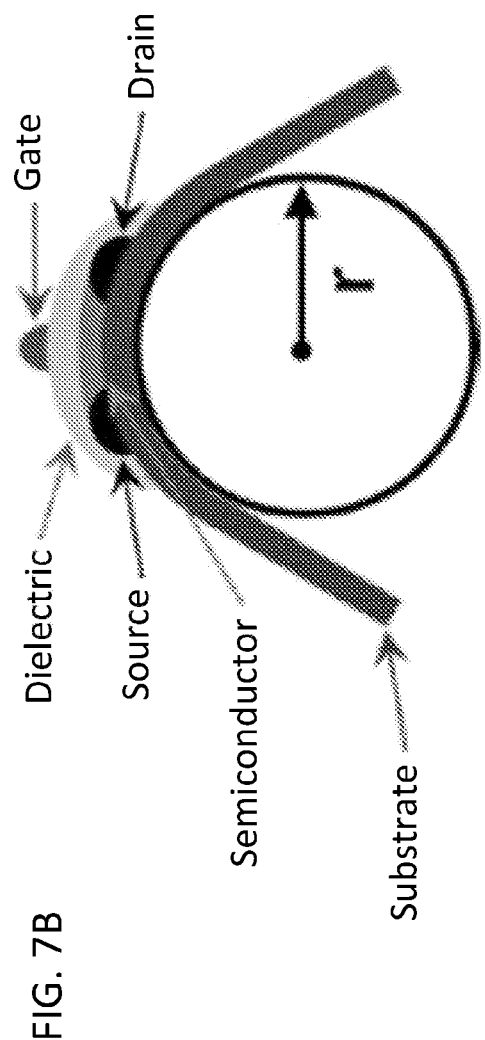

The deformable nature of the ionogel dielectric also enables mechanically flexible applications, as shown in FIG. 7A. To evaluate the mechanical stability of the flexible devices with the hBN ionogel dielectric, a bending test was performed with a bending radius (r) of about 14 mm, as shown in FIG. 7B, corresponding to a tensile strain (d/2r) of about 0.2% based on the substrate thickness (d) of about 50 FIG. 7C shows the changes in the device metrics (μ and $V_{th}$) during the bending test. Following 1,000 bending cycles, μ was reduced by less than about 3% (100%−μ/μ$_0$) and $V_{th}$ was shifted by only about 0.05 V ($V_{th}$−$V_{th,0}$) from the initial values (μ$_0$ and $V_{th,0}$). These minor changes in the device performance after repeated bending cycles indicate the desirable mechanical resilience of the hBN ionogel dielectric for flexible electronics.

Briefly, in one certain aspect, the invention discloses, among other things, aerosol-jet-printable ionogels employing exfoliated hBN nanoplatelets as the solid matrix. The hBN nanoplatelets were obtained from bulk hBN by scalable solution exfoliation, and the printable hBN ionogel inks were formulated by mixing the exfoliated hBN nanoplatelets, EMIM-TFSI, and ethyl lactate. The printable hBN ionogels show high ionic conductivities and mechanical strengths (i.e., storage moduli) of greater than about 3 mS cm$^{-1}$ and greater than about 1 MPa (with about 33% hBN solid loading at about 25° C.), respectively. Furthermore, the hBN ionogels were aerosol-jet-printed with variable patterns and controllable thicknesses, demonstrating well-behaved printability. Employing the hBN ionogel as a dielectric, fully-printed TFTs were also constructed on polyimide films with high uniformity, desirable transfer and output characteristics, and durable operation following repeated mechanically bending. Overall, this work establishes printable hBN ionogels as a robust and reliable dielectric material for low-voltage flexible and printed electronics.

In another aspect of the invention, the printable ionogel ink comprises an ionic liquid; and a solid matrix material, where the solid matrix material is mixed with the ionic liquid in at least one solvent.

In one embodiment, a ratio of the solid matrix material to the ionic liquid is about 1:2 by weight.

In one embodiment, a solid loading of the solid matrix material and the ionic liquid is about 20-50%.

In one embodiment, a concentration of the solid matrix material and the ionic liquid in the at least one solvent is about 90-150 mg mL$^{-1}$.

In one embodiment, the printable ionogel ink has a viscosity that is tunable by a shear rate, wherein the ink viscosity decreases as the shear rate increases.

In one embodiment, the printable ionogel ink has a storage modulus (G') that is higher than its loss modulus (G"), revealing the reliable solid-like behavior of the ionogel ink. In one embodiment, the solid-like behavior (G'>G") persists at temperatures in excess of about 40° C.

In one embodiment, the printable ionogel ink has ionic conductivity that increases with temperature.

In one embodiment, the ionic liquid comprises EMIM-TFSI, ammonium, imidazolium, pyrrolidinium, pyridinium, piperidinium, phosphonium, sulfonium-based ionic liquids, or a combination of them.

In one embodiment, the at least one solvent comprises a single solvent including ethyl lactate, cyclohexanone, terpineol, ethylene glycol, ethanol, isopropanol, or butanone.

In one embodiment, the solid matrix material comprises BNNS, BCN, oxide nanosheets, layered perovskites, hydroxide nanosheets including hydrotalcite-like layered double hydroxides, natural clays including bentonites and montmorillonites, or a combination of them.

In one embodiment, the BNNS comprises hexagonal boron nitride (hBN) nanoplatelets that are obtained from bulk hBN by scalable solution exfoliation. In one embodiment, the surface of each of the exfoliated hBN nanoplatelets has a thin amorphous carbon coating.

In one embodiment, the oxide nanosheets comprises $Al_2O_3$, $TiO_2$ (anatase and rutile), $ZrO_2$, $Nb_2O_5$, $HfO_2$, $CaCu_3Ti_4O_{12}$, $Pb(Zr, Ti)O_3$, $(Pb,La)(Zr, Ti)O_3$, $SiO_2$, $HfSiO_4$, $La_2O_3$, $LaAlO_3$, $BaTiO_3$, $SrTiO_3$, $Ta_2O_5$, or a combination of them.

In another aspect, the invention relates to a device comprising one or more components formed of the ionogel ink as disclosed above.

In one embodiment, the device can be one or more batteries, one or more supercapacitors, one or more transistors, one or more neuromorphic computing devices, one or more flexible electronics, one or more printed electronics, or any combination of them.

In one embodiment as disclosed above, by integrating the hBN ionogel with printed semiconductors and electrical contacts, fully-printed thin-film transistors with operating voltages below about 1 V are demonstrated on polyimide films. These devices exhibit desirable electrical performance and robust mechanical tolerance against repeated bending cycles, thus confirming the suitability of hBN ionogels for printed and flexible electronics.

In yet another aspect, the invention relates to a method for forming a printable ionogel ink comprising providing an ionic liquid and a solid matrix material; and mixing the solid matrix material with the ionic liquid in at least one solvent.

In one embodiment, a ratio of the solid matrix material to the ionic liquid is about 1:2 by weight.

In one embodiment, a solid loading of the solid matrix material and the ionic liquid is about 20-50%.

In one embodiment, a concentration of the solid matrix material and the ionic liquid in the at least one solvent is about 90-150 mg mL$^{-1}$.

In one embodiment, the printable ionogel ink has a viscosity that is tunable by a shear rate, wherein the ink viscosity decreases as the shear rate increases.

In one embodiment, the printable ionogel ink has a storage modulus (G') that is higher than its loss modulus (G"), revealing the reliable solid-like behavior of the ionogel ink. In one embodiment, the solid-like behavior (G'>G") persists at temperatures in excess of about 40° C.

In one embodiment, the printable ionogel ink has ionic conductivity that increases with temperature.

In one embodiment, the ionic liquid comprises EMIM-TFSI, ammonium, imidazolium, pyrrolidinium, pyridinium, piperidinium, phosphonium, sulfonium-based ionic liquids, or a combination of them.

In one embodiment, the at least one solvent comprises a single solvent including ethyl lactate, cyclohexanone, terpineol, ethylene glycol, ethanol, isopropanol, or butanone.

In one embodiment, the solid matrix material comprises BNNS, BCN, oxide nanosheets, layered perovskites, hydroxide nanosheets including hydrotalcite-like layered double hydroxides, natural clays including bentonites and montmorillonites, or a combination of them.

In one embodiment, the oxide nanosheets comprises $Al_2O_3$, $TiO_2$ (anatase and rutile), $ZrO_2$, $Nb_2O_5$, $HfO_2$, $CaCu_3Ti_4O_{12}$, $Pb(Zr,Ti)O_3$, $(Pb,La)(Zr,Ti)O_3$, $SiO_2$, $HfSiO_4$, $La_2O_3$, $LaAlO_3$, $BaTiO_3$, $SrTiO_3$, $Ta_2O_5$, or a combination of them.

In one embodiment, the BNNS comprises hexagonal boron nitride (hBN) nanoplatelets that are obtained by shear-mixing bulk hBN microparticles in ethanol with EC acting as the dispersing agent to form a shear-mixed dispersion; separating the exfoliated hBN nanoplatelets and EC from the shear-mixed dispersion by centrifuge-assisted sedimentation and flocculation; and collecting hBN/EC solids; and heating the collected hBN/EC solids at a temperature of about 300-500° C. for the period of time of about 2-4 hours to decompose the EC stabilizer, thereby volatilizing most of the EC, but also leaving behind a thin amorphous carbon coating on the surface of each of the exfoliated hBN nanoplatelets, which contributes to enhanced interactions between the hBN nanoplatelets and the ionic liquids for stronger solidification of the ionogel ink. In addition, for dielectric applications, the amorphous carbon coating is electrically insulating and thus does not cause unwanted leakage currents.

As a solid matrix material, hBN possesses several beneficial attributes such as electrically insulating character, chemical inertness, thermal stability, and mechanical robustness. Furthermore, compared to conventional bulk hBN microparticles, the smaller particle size of hBN nanoplatelets enables significant enhancement of ionogel mechanical strength without compromising ionic conductivity. While these initial results are promising, the previously developed hBN ionogel formulations are not compatible with the high-resolution and high-throughput additive manufacturing methods that are used for printed electronics. Thus, this invention enables enhancement in the processability of the hBN ionogels for practical applications and high-throughput additive manufacturing, without compromising their mechanical and electrochemical properties. The invention may find applications in a variety of fields such as, but is not limited to, lithium-ion batteries, supercapacitors, transistors, neuromorphic computing devices, flexible electronics, and printed electronics.

The invention, among other things, has at least the following advantages over the existing technology.

Printability enables the production of electronic devices with minimal materials waste and low cost, and also renders the device fabrication process compatible with roll-to-roll production schemes for high-throughput manufacturing.

Compared to conventional dielectrics (e.g., $SiO_2$), the high double-layer capacitance of ionogel electrolytes enables low-voltage operation of transistors for low-power and portable devices. Moreover, the ionogels are a favorable dielectric for flexible printed transistors because the electrolytes offer high tolerance to thickness variations and desirable mechanical flexibility without leakage issues.

Compared to common polymer solid matrices, the hBN solid matrix concurrently imparts high mechanical strength and ionic conductivity to printable ionogels.

These and other aspects of the present invention are further described below. Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Preparation of HBN Ionogel Ink

To exfoliate hBN nanoplatelets, a dispersion of bulk hBN (about 1 μm, Sigma-Aldrich), ethyl cellulose (4 cP viscosity grade, Sigma-Aldrich), and ethanol in a weight ratio of 10:1:52 were shear-mixed for 2 h at 10,230 rpm, using a rotor/stator mixer (L5M-A, Silverson) with a square hole screen. After centrifugation (J26-XPI, Beckman Coulter) of the shear-mixed dispersion at 4,000 rpm for 20 min to remove large particles, the supernatant was collected and mixed with an aqueous solution of 40 mg mL$^{-1}$ sodium chloride in a 16:9 weight ratio to flocculate exfoliated hBN nanoplatelets and EC. After centrifuging the mixture at 7,500 rpm for 6 min, the sediment containing exfoliated hBN nanoplatelets and EC was collected and washed with deionized water to remove residual sodium chloride, dried with an infrared lamp, and ground with a mortar and pestle to yield a fine powder. The hBN/EC powder was then annealed at 400° C. for 3 h in air to decompose EC. To prepare the printable hBN ionogel ink, the hBN nanoplatelets were mixed with EMIM-TFSI and ethyl lactate by bath sonication for 6 h. The ratio of the hBN nanoplatelets and ionic liquid was 1:2 by weight for 33% hBN solid loading of the ionogel (hBN and ionic liquid), and the concentration of the ionogel in ethyl lactate was 120 mg mL$^{-1}$. The hBN ionogel ink was printed using a commercially available aerosol jet printer (Aerosol Jet 200, Optomec) with a 300 μm diameter nozzle. The flow rates of the carrier gas and sheath gas were 15 and 20 ccm, respectively, and the printing was performed with the substrate temperature maintained at 60° C.

Fabrication of Fully-Printed TFTS

To prepare the graphene ink for the source and drain electrodes, graphene nanoplatelets were obtained by solution exfoliation of graphite flakes (Sigma-Aldrich). In particular, a dispersion of graphite flakes, EC, and ethanol in a 30:1:20 weight ratio was shear-mixed for 23 h using an inline mixer (200 L, Silverson) equipped with a square hole screen. The shear-mixed dispersion was then centrifuged at 6,500 rpm for 30 min to crash out unexfoliated graphite, after which the supernatant containing exfoliated graphene and EC was collected and flocculated with an aqueous solution of 40 mg mL$^{-1}$ sodium chloride in a 16:9 weight ratio. After centrifuging the mixture at 7,000 rpm for 7 min, the sediment containing graphene and EC were collected from the bottles and washed with deionized water to remove residual sodium chloride, dried with an infrared lamp, and ground with a mortar and pestle to yield a fine powder. The printable graphene ink was obtained by dispersing the graphene/EC (1:1 by weight) powder in a solvent system of ethyl lactate and terpineol (9:1 by volume) at a concentration of 30 mg mL$^{-1}$ by bath sonication for 6 h. The graphene ink was printed on polyimide with a substrate temperature of 60° C., and the printed graphene electrodes were further annealed at 300° C. for 30 min in air to decompose EC and thereby improve the electrical conductivity. Following the deposition of the source and drain electrodes, the semiconductor channel, hBN ionogel dielectric, and gate electrode were deposited sequentially by aerosol jet printing. The semiconductor channel was printed with an ink of P3HT (molecular weight: 50-100 k, Sigma-Aldrich) dissolved in a solvent system of chloroform/terpineol (9:1 by volume) at a concentration of 1 mg mL$^{-1}$. The gate electrode was printed with a conductive ink containing PEDOT:PSS (Clevios PH1000, Heraeus) and ethylene glycol (9:1 by volume). The graphene, P3HT, and PEDOT:PSS inks were printed with a 150 μm diameter nozzle. The flow rates of carrier gas and sheath gas, respectively, were 20 ccm and 70 ccm for graphene, 15 ccm and 30 ccm for P3HT, and 20 ccm and 30 ccm for PEDOT:PSS. Following printing, the TFTs were annealed at 160° C. for 30 min in air before electrical characterization.

Characterization

The exfoliated hBN nanoplatelets were observed using a scanning electron microscope (SU8030, Hitachi). Shear viscosity of the hBN ionogel ink was measured using a rheometer (MCR 302, Anton Paar) equipped with a 25 mm, 2° cone and plate geometry. Viscoelastic properties of the hBN ionogels were characterized using the rheometer equipped with a 25 mm diameter parallel plate (gap between the rheometer stage and parallel plate: 1 mm) with a strain of 0.1%. Ionic conductivity (σ) of the hBN ionogels was calculated based on the following equation:

$$\sigma = \frac{t}{A \times R}$$

where t is the sample thickness, A is the sample area, and R is the bulk resistance determined by electrochemical impedance spectroscopy (VSP, BioLogic). Cross-sectional profiles of the printed hBN ionogels were obtained using a laser confocal microscope (OLS5000, OLYMPUS). Electrical performance of the fabricated TFTs was measured using source meters (2400, Keithley) in air at room temperature.

Due to its excellent chemical/thermal stability and mechanical robustness, hexagonal boron nitride (hBN) is a promising solid matrix material for ionogels. While bulk hBN ionogels have been employed in macroscopic applications such as lithium-ion batteries, hBN ionogel inks that are compatible with high-resolution printing have not yet been realized. This invention discloses aerosol-jet-printable ionogels using exfoliated hBN nanoplatelets as the solid matrix. The hBN nanoplatelets are produced from bulk hBN powders by liquid-phase exfoliation, allowing printable hBN ionogel inks to be formulated following the addition of an imidazolium ionic liquid and ethyl lactate. The resulting inks are reliably printed with variable patterns and controllable thicknesses by aerosol jet printing, resulting in hBN ionogels that possess high room-temperature ionic conductivities and storage moduli of greater than about 3 mS cm$^{-1}$ and greater than about 1 MPa, respectively. By integrating the hBN ionogel with printed semiconductors and electrical contacts, fully-printed thin-film transistors with operating voltages below about 1 V are demonstrated on polyimide films. These devices exhibit desirable electrical performance and robust mechanical tolerance against repeated bending cycles, thus confirming the suitability of hBN ionogels for printed and flexible electronics.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

LIST OF REFERENCES

[1]. A. C. Arias, S. E. Ready, R. Lujan, W. S. Wong, K. E. Paul, A. Salleo, M. L. Chabinyc, R. Apte and R. A. Street, *Appl. Phys. Lett.*, 2004, 85, 3304-3306.

[2]. M. Berggren, D. Nilsson and N. D. Robinson, *Nat. Mater.*, 2007, 6, 3-5.

[3]. V. Subramanian, J. M. J. Fréchet, P. C. Chang, D. C. Huang, J. B. Lee, S. E. Molesa, A. R. Murphy, D. R. Redinger and S. K. Volkman, *Proc. IEEE*, 2005, 93, 1330-1338.

[4]. G. Mattana and D. Briand, *Mater. Today*, 2016, 19, 88-99.

[5]. K. Chen, W. Gao, S. Emaminejad, D. Kiriya, H. Ota, H. Y. Y. Nyein, K. Takei and A. Javey, *Adv. Mater.*, 2016, 28, 4397-4414.

[6]. F. C. Krebs, *Sol. Energy Mater. Sol. Cells*, 2009, 93, 394-412.

[7]. S. Ito, P. Chen, P. Comte, M. Nazeeruddin, P. Liska, P. Pechy and M. Gratzel, *Prog. Photovoltaics: Res. Appl.*, 2007, 15, 603-612.

[8]. L. J. Deiner and T. L. Reitz, *Adv. Eng. Mater.*, 2017, 19, 1600878.

[9]. G. Chen, Y. Gu, H. Tsang, D. R. Hines and S. Das, *Adv. Eng. Mater.*, 2018, 20, 1701084.

[10]. E. B. Secor, *Flex. Print. Electron.*, 2018, 3, 035002.

[11]. K. Wang, Y.-H. Chang, C. Zhang and B. Wang, *Carbon*, 2016, 98, 397-403.

[12]. E. Jabari and E. Toyserkani, *Mater. Lett.*, 2016, 174, 40-43

[13]. B. A. Williams, A. Mahajan, M. A. Smeaton, C. S. Holgate, E. S. Aydil and L. F. Francis, *ACS Appl. Mater. Interfaces*, 2015, 7, 11526-11535.

[14]. E. Jabari and E. Toyserkani, *Carbon*, 2015, 91, 321-329.

[15]. L. Tu, S. Yuan, H. Zhang, P. Wang, X. Cui, J. Wang, Y.-Q. Zhan and L.-R. Zheng, *J. Appl. Phys.*, 2018, 123, 174905.

[16]. J. G. Tait, E. Witkowska, M. Hirade, T.-H. Ke, P. E. Malinowski, S. Steudel, C. Adachi and P. Heremans, *Org. Electron.*, 2015, 22, 40-43.

[17]. L. J. Deiner, T. Jenkins, A. Powell, T. Howell and M. Rottmayer, *Adv. Eng. Mater.*, 2019, 21, 1801281.

[18]. J. H. Cho, J. Lee, Y. Xia, B. Kim, Y. He, M. J. Renn, T. P. Lodge and D. Frisbie, *Nat. Mater.*, 2008, 7, 900-906.

[19]. J. L. Bideau, L. Viau and A. Vioux, *Chem. Soc. Rev.*, 2011, 40, 907-925.

[20]. S. Wang, B. Hsia, C. Carraroa and R. Maboudian, *J. Mater. Chem. A*, 2014, 2, 7997-8002.

[21]. N. Chen, H. Zhang, L. Li, R. Chen and S. Guo, *Adv. Energy Mater.*, 2018, 8, 1702675.

[22]. Z. Jiadi, Y. Yuchao, J. Rundong, L. Zhongxin, Z. Wen, R. Z. Ur, B. Lin, Z. Xiaoxian, C. Yimao, S. Li and H. Ru, *Adv. Mater.*, 2018, 30, 1800195.

[23]. W. J. Hyun, A. C. M. de Moraes, J.-M. Lim, J. R. Downing, K.-Y. Park, M. T. Z. Tan and M. C. Hersam, *ACS Nano*, 2019, 13, 9664-9672.

[24]. Y. T. Liang and M. C. Hersam, *J. Am. Chem. Soc.*, 2010, 132, 17661-17663.

[25]. A. C. M. de Moraes, W. J. Hyun, J.-W. T. Seo, J. R. Downing, J.-M. Lim and M. C. Hersam, *Adv. Funct. Mater.*, 2019, 29, 1902245.

[26]. C. Cao, J. B. Andrews and A. D. Franklin, *Adv. Electron. Mater.*, 2017, 3, 1700057.

[27]. C. Yang, E. Zhou, S. Miyanishi, K. Hashimoto and K. Tajima, *ACS Appl. Mater. Interfaces*, 2011, 3, 4053-4058.

[28]. K. Ueno, K. Hata, T. Katakabe, M. Kondoh and M. Watanabe, *J. Phys. Chem. B*, 2008, 112, 9013-9019.

[29]. B. Avvaru, M. N. Patil, P. R. Gogate and A. B. Pandit, *Ultrasonics*, 2006, 44, 146-158.

[30]. K. Hayamizu, Y. Aihara, H. Nakagawa, T. Nukuda and W. S. Price, *J. Phys. Chem. B*, 2004, 108, 19527-19532.

[31]. A. Grandjean, M. Malki, C. Simonnet, D. Manara and B. Penelon, *Phys. Rev. B*, 2007, 75, 054112.

[32]. Y. Lu, K. Korf, Y. Kambe, Z. Tu and L. A. Archer, *Angew. Chem. Int. Ed.*, 2014, 53, 488-492.

[33]. M. Patel, M. Gnanavel and A. J. Bhattacharyya, *J. Mater. Chem.*, 2011, 21, 17419-17424.

[34]. Y. Lu, S. S. Moganty, J. L. Schaefer and L. A. Archer, *J. Mater. Chem.*, 2012, 22, 4066-4072.

[35]. M. Ha, Y. Xia, A. A. Green, W. Zhang, M. J. Renn, C. H. Kim, M. C. Hersam and C. D. Frisbie, *ACS Nano*, 2010, 4, 4388-4395.

[36]. J.-H. Choi, W. Xie, Y. Gu, C. D. Frisbie and T. P. Lodge, *ACS Appl. Mater. Interfaces*, 2015, 7, 7294-7302.

[37]. K. Hong, S. H. Kim, K. H. Lee and C. D. Frisbie, *Adv. Mater.*, 2013, 25, 3413-3418.

[38]. B. Tang, S. P. White, C. D. Frisbie and T. P. Lodge, *Macromolecules*, 2015, 48, 4942-4950

[39]. S. Ogawa, T. Naijo, Y. Kimura, H. Ishii and M. Niwano, *Synth. Met.*, 2005, 153, 253-256.

[40]. S. H. Kim, K. Hong, W. Xie, K. H. Lee, S. Zhang, T. P. Lodge and C. D. Frisbie, *Adv. Mater.*, 2013, 25, 1822-1846.

[41]. E. B. Secor, P. L. Prabhumirashi, K. Puntambekar, M. L. Geier and M. C. Hersam, *J. Phys. Chem. Lett.*, 2013, 4, 1347-1351.

[42]. E. B. Secor, B. Y. Ahn, T. Z. Gao, J. A. Lewis and M. C. Hersam, *Adv. Mater.*, 2015, 27, 6683-6688.

[43]. C. D. Frisbie et al., Ion gels and electronic devices utilizing ion gels (2008), WO2008097300A3.

[44]. S. P. White et al., Electrolyte-gated transistors for detection of molecules (2016), WO2016025743.

[45]. A. Liu et al., Vapor-deposited nanoscale ionic liquid gels as gate insulators for low-voltage high-speed thin film transistors (2019), US 20190131554 A1.

[46]. P. K. Wright et al., Ionic gel electrolyte, energy storage devices, and methods of manufacture thereof (2018), US20180226680A1.

[47]. R. V. Singh et al., Polymer ionic electrolytes (2011), U.S. Pat. No. 7,955,738B2.

What is claimed is:

1. A printable ionogel ink, comprising:
an ionic liquid; and
a solid matrix material mixed with the ionic liquid in at least one solvent,
wherein the ionic liquid comprises 1-ethyl-3-methylimidazolium bis(trifluoromethylsulfonyl) imide (EMIM-TFSI), and the solid matrix material comprises exfoliated hexagonal boron nitride (hBN) nanoplatelets.

2. The printable ionogel ink of claim 1, wherein a ratio of the exfoliated hBN nanoplatelets to the EMIM-TFSI is about 1:2 by weight.

3. The printable ionogel ink of claim 2, wherein a solid loading of the exfoliated hBN nanoplatelets to the EMIM-TFSI is about 33%.

4. The printable ionogel ink of claim 2, wherein a concentration of the exfoliated hBN nanoplatelets to the EMIM-TFSI in the at least one solvent is about 120 mg mL-1.

5. The printable ionogel ink of claim 1, wherein each exfoliated hBN nanoplatelet is coated with a thin amorphous carbon coating.

6. The printable ionogel ink of claim 1, having a viscosity that is tunable by a shear rate, wherein the ink viscosity decreases as the shear rate increases.

7. The printable ionogel ink of claim 1, having a storage modulus (G') that is higher than its loss modulus (G"), revealing the reliable solid-like behavior of the ionogel ink.

8. The printable ionogel ink of claim 1, wherein the at least one solvent comprises a single solvent including ethyl lactate, cyclohexanone, terpineol, ethylene glycol, ethanol, isopropanol, or butanone.

9. A printable ionogel ink, comprising:
an ionic liquid; and
a solid matrix material
wherein the solid matrix material is mixed with the ionic liquid in at least one solvent, wherein the printable ionogel ink has a storage modulus (G') that is higher than its loss modulus (G"), revealing the reliable solid-like behavior of the ionogel ink, wherein the solid-like behavior (G'>G") persists at temperatures in excess of about 40° C.

10. The printable ionogel ink of claim 9, wherein a ratio of the solid matrix material to the ionic liquid is about 1:2 by weight.

11. The printable ionogel ink of claim 10, wherein a solid loading of the solid matrix material and the ionic liquid is about 20-50%.

12. The printable ionogel ink of claim 10, wherein a concentration of the solid matrix material and the ionic liquid in the at least one solvent is about 90-150 mg mL$^{-1}$.

13. The printable ionogel ink of claim 9, having a viscosity that is tunable by a shear rate, wherein the ink viscosity decreases as the shear rate increases.

14. The printable ionogel ink of claim 9, having ionic conductivity that increases with temperature.

15. The printable ionogel ink of claim 9, wherein the ionic liquid comprises 1-ethyl-3-methylimidazolium bis(trifluoromethylsulfonyl) imide (EMIM-TFSI), ammonium, imidazolium, pyrrolidinium, pyridinium, piperidinium, phosphonium, sulfonium-based ionic liquids, or a combination of them.

16. The printable ionogel ink of claim 9, wherein the at least one solvent comprises a single solvent including ethyl lactate, cyclohexanone, terpineol, ethylene glycol, ethanol, isopropanol, or butanone.

17. The printable ionogel ink of claim 9, wherein the solid matrix material comprises boron nitride nanosheets (BNNS), borocarbonitrides (BCN), oxide nanosheets, layered perovskites, hydroxide nanosheets including hydrotalcite-like layered double hydroxides, natural clays, or a combination of them, wherein the natural clays comprise bentonites and montmorillonites.

18. The printable ionogel ink of claim 17, wherein the BNNS comprises hexagonal boron nitride (hBN) nanoplatelets that are obtained from bulk hBN by scalable solution exfoliation.

19. The printable ionogel ink of claim 18, wherein each exfoliated hBN nanoplatelet is coated with a thin amorphous carbon coating.

20. The printable ionogel ink of claim 17, wherein oxide nanosheets comprises $Al_2O_3$, $TiO_2$ (anatase and rutile), $ZrO_2$, $Nb_2O_5$, $HfO_2$, $CaCu_3Ti_4O_{12}$, $Pb(Zr,Ti)O_3$, $(Pb,La)(Zr,Ti)O_3$, $SiO_2$, $HfSiO_4$, $La_2O_3$, $LaAlO_3$, $BaTiO_3$, $SrTiO_3$, $Ta_2O_5$, or a combination of them.

21. A device, comprising:
one or more components formed of the ionogel ink according to of claim 1.

22. The device of claim 21, being one or more batteries, one or more supercapacitors, one or more transistors, one or more neuromorphic computing devices, one or more flexible electronics, one or more printed electronics, or any combination of them.

23. A method for forming a printable ionogel ink, comprising:
providing an ionic liquid and a solid matrix material; and mixing the solid matrix material with the ionic liquid in at least one solvent.

24. The method of claim 23, wherein a ratio of the solid matrix material to the ionic liquid is about 1:2 by weight.

25. The method of claim 23, wherein a solid loading of the solid matrix material and the ionic liquid is about 20-50%.

26. The method of claim 23, wherein a concentration of the solid matrix material and the ionic liquid in the at least one solvent is about 90-150 mg mL$^{-1}$.

27. The method of claim 23, wherein the printable ionogel ink has a viscosity that is tunable by a shear rate, wherein the ink viscosity decreases as the shear rate increases.

28. The method of claim 23, wherein the printable ionogel ink has a storage modulus (G') that is higher than its loss modulus (G"), revealing the reliable solid-like behavior of the ionogel ink.

29. The method of claim 28, wherein the solid-like behavior (G'>G") persists at temperatures in excess of about 40° C.

30. The method of claim 23, wherein the printable ionogel ink has ionic conductivity that increases with temperature.

31. The method of claim 23, wherein the ionic liquid comprises 1-ethyl-3-methylimidazolium bis(trifluoromethylsulfonyl) imide (EMIM-TFSI), ammonium, imidazolium, pyrrolidinium, pyridinium, piperidinium, phosphonium, sulfonium-based ionic liquids, or a combination of them.

32. The method of claim 23, wherein the at least one solvent comprises a single solvent including ethyl lactate, cyclohexanone, terpineol, ethylene glycol, ethanol, isopropanol, or butanone.

33. The method of claim 23, wherein the solid matrix material comprises boron nitride nanosheets (BNNS), borocarbonitrides (BCN), oxide nanosheets, layered perovskites, hydroxide nanosheets including hydrotalcite-like layered double hydroxides, natural clays, or a combination of them, wherein the natural clays comprise bentonites and montmorillonites.

34. The method of claim 33, wherein oxide nanosheets comprises $Al_2O_3$, $TiO_2$ (anatase and rutile), $ZrO_2$, $Nb_2O_5$, $HfO_2$, $CaCu_3Ti_4O_{12}$, $Pb(Zr,Ti)O_3$, $(Pb,La)(Zr,Ti)O_3$, $SiO_2$, $HfSiO_4$, $LaAlO_3$, $BaTiO_3$, $SrTiO_3$, $Ta_2O_5$, or a combination of them.

35. The method of claim 33, wherein the BNNS comprises hexagonal boron nitride (hBN) nanoplatelets that are obtained by
shear-mixing bulk hBN microparticles in ethanol with ethyl cellulose (EC) acting as a dispersing agent to form a shear-mixed dispersion;
separating the exfoliated hBN nanoplatelets and EC from the shear-mixed dispersion by centrifuge-assisted sedimentation and flocculation; and collecting hBN/EC solids; and
heating the collected hBN/EC solids at a temperature for a period of time to decompose the EC, thereby volatilizing most of the EC, but also leaving behind a thin amorphous carbon coating on the surface of each of the exfoliated hBN nanoplatelets, which contributes to enhanced interactions between the hBN nanoplatelets and the ionic liquids for stronger solidification of the ionogel ink.

36. The method of claim 35, wherein the temperature is about 300-500° C., and the period of time is for about 2-4 hours.

* * * * *